United States Patent
Doggett

(10) Patent No.: US 6,718,414 B1
(45) Date of Patent: Apr. 6, 2004

(54) FUNCTION MODIFICATION IN A WRITE-PROTECTED OPERATING SYSTEM

(75) Inventor: Dana D. Doggett, Orem, UT (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/521,677

(22) Filed: Mar. 8, 2000

(51) Int. Cl.$^7$ .................................................. G06F 13/00

(52) U.S. Cl. ...................... 710/267; 711/154; 711/163; 710/260; 712/15; 712/43; 712/220; 712/229; 712/242; 712/243; 713/1; 713/100

(58) Field of Search .............................. 711/145, 154, 711/156, 163; 710/6, 14, 260, 267; 712/15, 43, 220, 242, 243, 226, 229; 713/1, 100

(56) References Cited

U.S. PATENT DOCUMENTS

| | | | | |
|---|---|---|---|---|
| 5,257,381 A | | 10/1993 | Cook | ........................ 395/700 |
| 5,960,190 A | * | 9/1999 | MacKenna | .................... 703/28 |
| 6,363,474 B1 | * | 3/2002 | McCulley et al. | .......... 711/132 |
| 6,487,630 B2 | * | 11/2002 | Bui | ............................ 711/109 |

OTHER PUBLICATIONS

Microsoft Press computer Dictionary, Third Edition, p. 341.*

Microsoft Corporation, Microsoft Windows Device Development Kit (DDK) for Windows, version 3.1, http://support.microsoft.com/support/kb/articles/Q78/3/25.ASP, "Ring Protection Under Windows 3.1" Nov. 1, 1999, pp. 1–2.

Apple Computer, Inc. Inside Macintosh: Operating Systems Utilities/Chapter 8–Trap manager, http://gemma.apple.com/techpubs/mac/OSUtilities/OSUtilities–170.html, "About the Trap Manager", Jul. 6, 1996, pp. 1–18.

Part II Systems Programming, http://www.online.ee/–andre/i80386/Chap4.html, "Chapter 4 Systems Arthitecture", Mar. 7, 2000, pp. 1–5.

Chapter 6 Protection, http://www.online.ee/~andre/880386/Chap6.html, "Chapter 6 Protection", Mar. 7, 2000, pp. 1–15.

Microsoft Corporation, http://leb.net.wine/WinDoc/msdn/sdk/platforms/doc/sdk/win32/func/src/f17 6.htm, "DIIEntryPoint", 1997, pp. 1–3.

http://www.iecc.com/linker/linker10.html, "Dynamic Linking and Loading," Jun. 15, 1999, pp. 1–14.

Sun Microsystems, Inc. Kempf et al, "Cross–Address Space Dynamic Linking", The SMLI Technical Report Series, Sep. 1992, pp. 1–11.

Intel 80386 Programmer's Reference, http://www.online.ee/~andre/i80386/, "Intel 80386 Programmer's Reference", p. 1.

http://www.online.ee/~andre/i80386/Figs/Fig.6.html, Fig. 6–1 Protection Field of Segment Descriptors, Mar. 7, 2000, pp. 1–6.

http://www.acm.uiuc.edu/sigops/roll your own/i386/regs.html, The Intel 32–bit Register Set, 32–Bit Register Set, Mar. 7, 2000, pp. 1–3.

http://www.cs.umd.edu/~saltz/cs412/combine.html, Intel x86: Paging, Mar. 7, 2000, p. 1.

(List continued on next page.)

*Primary Examiner*—Mano Radmanabhan
*Assistant Examiner*—Jasmine Song
(74) *Attorney, Agent, or Firm*—Pillsbury Winthrop LLP

(57) ABSTRACT

An apparatus and method are disclosed for runtime modification of called functions within a write-protected operating system. The access state of a processor is altered to allow modification of the function code, and a redirection to a hook function is inserted at a target entry point within the called function. The access state of the processor may then be restored, and the hook function is executed in place of or in conjunction with the called function.

32 Claims, 7 Drawing Sheets

OTHER PUBLICATIONS http://www.sandpile.org/arch/crx/htm, "IA–32 Architecture Control Registers", Mar. 7, 2000, p. 1.

http://www.cs.umd.edu/~saltz/cs412/lecture4/lect4.html, "Segment level Protection", Mar. 7, 2000, pp. 1–5.

http://x86.ddj.com/articles/pmbasics/tspec a1 doc.htm, Robert Collins, "Protected Mode Basics" Mar. 6, 2000, pp. 1–12.

http://www scm.tees.ac.uk/users/a.clements/Excepts/Excepts.htm, "Exception Handling and Computer Security", Mar., 2000 pp. 1–31.

http://nic.funet.fi/pub/cmb/pet/manuals/8296supplement/8296supplement.txt, "CBM 8296–Supplement to the 8032 Manual", Mar. 6, 2000, pp. 1–6.

* cited by examiner

L100 — mov eax, cr0
L110 — push eax
L120 — and eax, $FEFF
L130 — mov cr0, eax

. . .

L200 — pop eax
L210 — mov cr0, eax

FIG. 5

FUNCTION MODIFICATION IN A WRITE-PROTECTED OPERATING SYSTEM

BACKGROUND

1. Field of the Invention

The present invention relates in general to operating systems, and in particular to a method and apparatus to modify a system function in a computer running a write-protected operating system.

2. Description of the Related Art

It is sometimes desirable to intercept calls to system functions and to modify the called functions before they execute. In a computer system where clients request files from a server, for example, it may be desirable to modify the sequence of instructions within a global file function (e.g. a function to open a file) in order to conduct automatic virus-scanning of a requested file before forwarding it to the client. In this case, the modification may direct the central processing unit (CPU) to perform a virus-scanning operation on the file before conditionally returning to execute the original function code (i.e. depending on whether a virus was detected). Methods of "hooking" target entry points in called functions and adding new code were disclosed by Cook in U.S. Pat. No. 5,257,381, "METHOD OF INTERCEPTING A GLOBAL FUNCTION OF A NETWORK OPERATING SYSTEM AND CALLING A MONITORING FUNCTION," issued Oct. 26, 1993 and assigned to the assignee of this application.

Write-protected computer operating systems such as Windows 200™ (Microsoft Corp., Redmond, Wash.) and NetWare™ 5.1 (Novell, Inc., Provo, Utah) prevent modification of system functions that have been loaded into memory by write-protecting the areas of main memory in which the function codes are stored. An attempt by a process to use a method as disclosed by Cook with such a write-protected operating system may result in an exception, causing the offending process and possibly the entire operating system to terminate. For this reason, it has been impossible to perform modification of system functions in a computer running a write-protected operating system.

BRIEF DESCRIPTION OF THE DRAWINGS

FIG. 5 is an exemplary code fragment for a portion of the implementation of FIG. 4.

DETAILED DESCRIPTION

Figure 1:
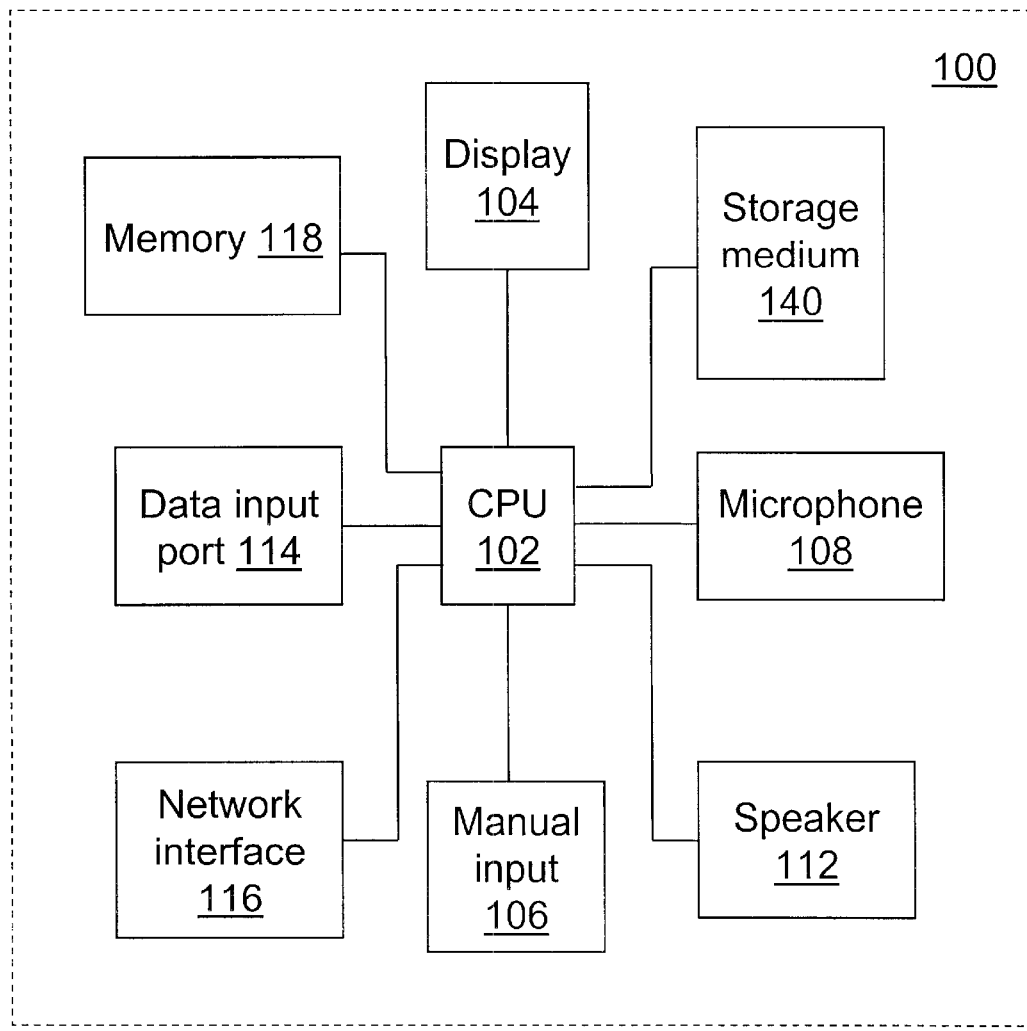
FIG. 1 is a block diagram of a computer.

FIG. 1 shows a block diagram of an exemplary computer 100 (FIG. 1) which runs a write-protected operating system. Computer 100 includes a central processing unit (CPU) 102, which may comprise one or more microprocessors, microcontrollers, or other processing units such as digital signal processors. For example, CPU 102 may be a microprocessor such as the Pentium III™ processor manufactured by Intel Corporation. Alternatively, CPU 102 may be an embedded processor. Programs to be executed by CPU 102 may be obtained from a computer-readable storage medium 140 or alternatively from another location across a computer network. CPU 102 is connected to computer memory 118, and computer 100 is controlled by a write-protected operating system (OS) that resides within memory 118. System functions residing within memory 118 may include functions of the operating system as well as functions relating to particular hardware or software components of computer 100 (e.g. functions associated with device drivers or application program interfaces).

CPU 102 may communicate with one or more peripheral devices, which may include but are not limited to a display 104, manual input 106, storage medium 140, microphone 108, speaker 112, data input port 114 and network interface 116. Display 104 may be a visual display such as a cathode ray tube (CRT) monitor, a liquid crystal display (LCD) screen, a touch-sensitive screen, or another device for visually displaying images and text to a user. Manual input 106 may be a conventional keyboard, keypad, mouse, trackball, and/or other device for the manual input of data. Storage medium 140 may be a readable (and possibly writable) memory such as a magnetic and/or optical disk drive, a semiconductor memory (e.g. static, dynamic, or flash RAM), or another computer-readable memory device. Significantly, storage medium 140 may be remotely located from CPU 102, being connected to CPU 102 via a network such as a local area network (LAN), or a wide area network (WAN), or the Internet.

Microphone 110 may be any microphone or sound-sensing device suitable for providing audio signals to CPU 102. Speaker 112 may be any speaker or sound-reproducing device suitable for reproducing audio signals from CPU 102. It is understood that microphone 108 and speaker 112 may include digital-to-analog and/or analog-to-digital conversion circuitry as appropriate. Data input port 114 is suitable for interfacing with an external accessory using a communications protocol such as RS-232, Universal Serial Bus (USB), IEEE 1394 ('Firewire'), etc.

Figure 2:
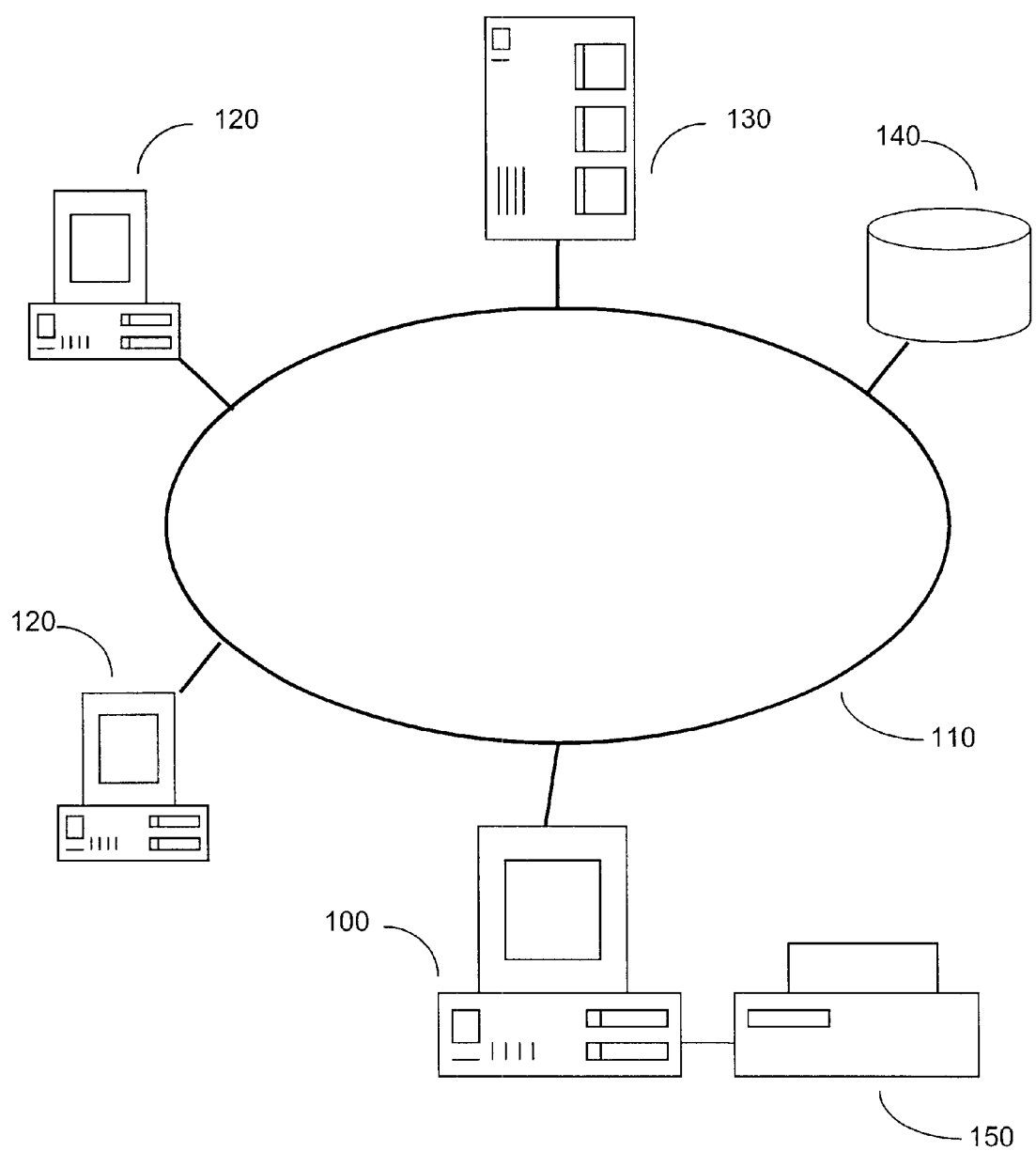
FIG. 2 is a block diagram of a computer network.

As shown in FIG. 2, external peripherals 150 such as printers, plotters, scanners, cameras, or other devices may also be connected to system 100. Network interface 116 is suitable for communicating or transferring files across a computer network 110, examples of such networks including Ethernet, star, and token ring networks that may use one or more protocols such as Transmission Control Protocol/Internet Protocol (TCP/IP), IPX, or NetBIOS. On some systems, network interface 116 may comprise a modem connected to data input port 114. Other computers 120, servers 130, and storage media 140 may also be connected to network 110.

Figure 3:
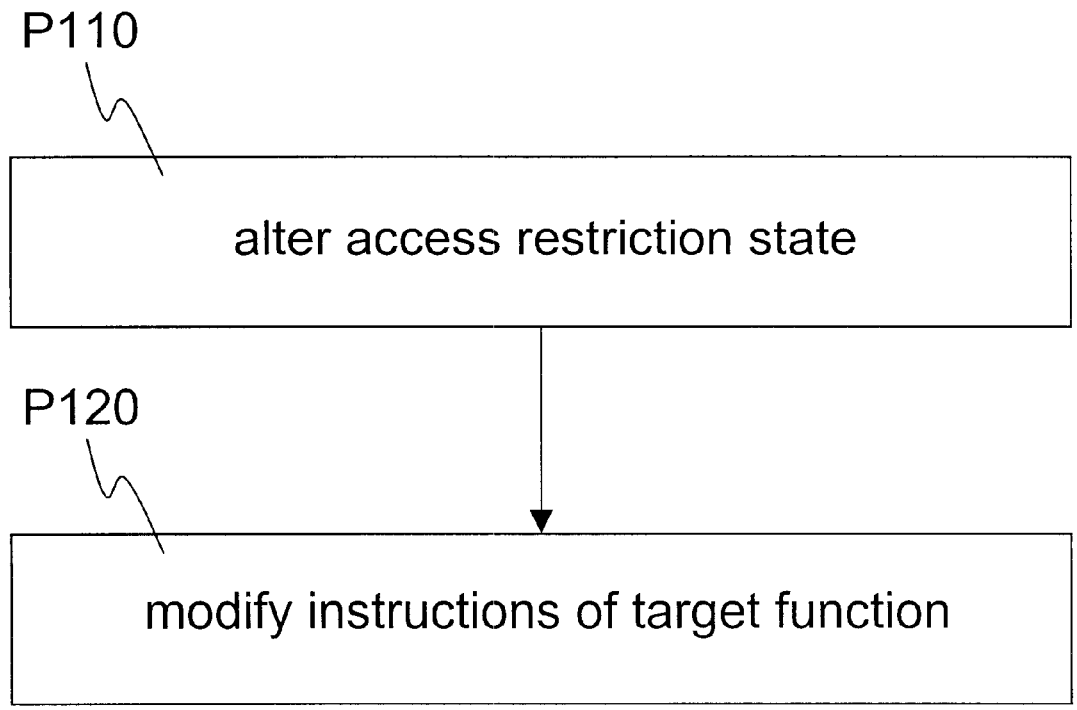
FIG. 3 is a flowchart of a method according to an embodiment of the invention.

FIG. 3 illustrates a flowchart for a method according to an embodiment of the invention. It is assumed that prior to the execution of task P110, the location of at least the starting point of the target function (i.e. the function to be modified) within memory 118 is known. If necessary, a preliminary determination of this location may be performed according to a method as disclosed by Cook or by any other method known in the art.

In task P110, an access restriction state is altered in order to allow modification of the instructions of the target function. Depending on the nature of CPU 102, the nature of the memory management scheme of computer 100, and/or the nature of the write-protection mechanism implemented within the operating system, this access restriction state may be a characteristic of CPU 102 and/or of the area of main memory where the function code to be modified resides. In task P120, modification of the instructions of the target function is performed.

Figure 4:
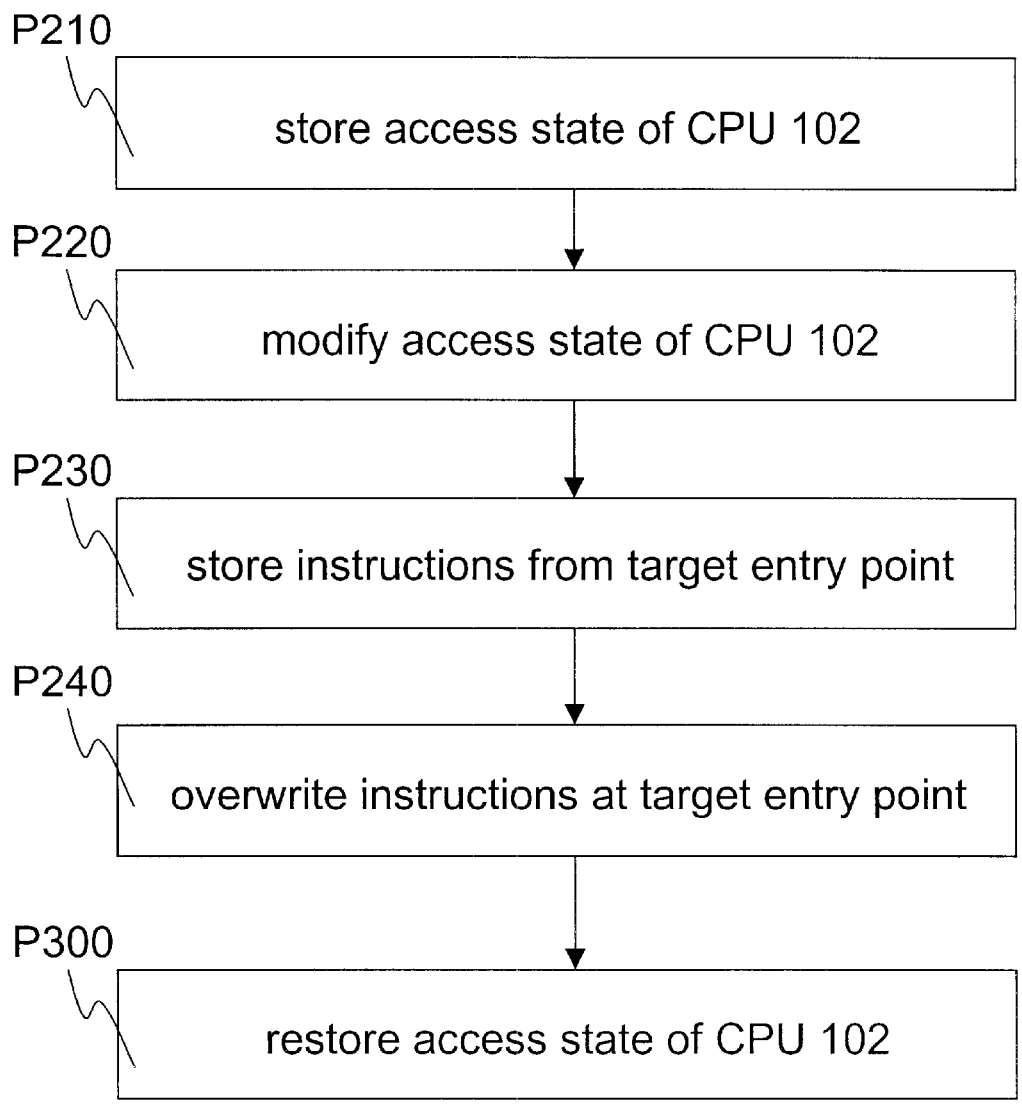
FIG. 4 is a flowchart of an implementation of the method of FIG. 3.

FIG. 4 shows a general implementation of the method of FIG. 3 where the access restriction state is a characteristic of CPU 102. In this example, a target function is modified by replacing instructions at a target entry point within the function code. This target entry point may occur at any place within the function code, although in order to avoid disruption of the called function it may be desirable for the target entry point to coincide with the very beginning of the function code or to occur at or near the very end of the function code. (For convenience, it is assumed throughout the following discussion that the target entry point occurs at the very beginning of the function code.)

In task P210, the access state of CPU 102 is stored (e.g. in a register, on a stack, or in main memory). In task P220, the access state of CPU 102 is modified to allow CPU 102 to modify the code of the target function. In task P230, instructions at the target entry point of the target function are copied elsewhere if necessary (e.g. for later restoration and/or execution), and in task P240, the function code is modified by overwriting the instructions at the target entry point with new instructions (one or more instructions directing CPU 102 to execute a hook function, for example).

In task P300, the access state of CPU 102 is restored to the state that existed before task P210 was performed. While performing task P300 may not be strictly necessary, it is possible that an instruction or sequence of instructions to be executed in the future will expect CPU 120 to have the access state that existed before task P210 was performed. Therefore, restoring the access state of CPU 102 may be desirable from a system stability viewpoint. Note that this rationale may also apply to an implementation in which the access restriction state is a characteristic of memory 118 rather than (or in addition to) being a characteristic of CPU 102.

FIG. 5 shows assembly language source code for an exemplary implementation of a portion of the method of FIG. 4 where CPU 102 is one among the x86 family of Intel microprocessors (including processors of the Pentium family). Specifically, CPU 102 is a 25 model 80486 or higher Intel microprocessor having a control register designated CR0. Bit 16 of register CR0 (designated 'Write Protect' or 'WP') defines an access state of the CPU, in that when this WP bit is set, the CPU is prevented from writing to pages that are marked as read-only. This access restriction applies regardless of the current privilege level of the CPU, and an attempt to write to a protected page (even when the CPU is in the most privileged level) when bit 16 is set may generate an exception. In a write-protected operating system such as Windows 2000™ or NetWare™ 5.1, for example, runtime alteration of function codes is prevented by setting bit 16 of register CR0.

In line L100, the contents of register CR0 are copied to another register (note that practice of the invention is not limited to use of the general-purpose register eax). In line L110, the contents of this second register are pushed onto the stack, thereby completing task P210 by storing the existing access state of CPU 102.

Direct alteration of register CR0 is not supported in the x86 instruction set. In line L120, therefore, the access state information is modified by performing a bitwise AND operation between the contents of register eax and a data constant in which all bits are high except bit 16. The effect of this instruction is to reset bit 16 of register eax to the low state while leaving the rest of the bits of register eax unchanged. In line L130, the new contents of register eax are stored to CR0, thereby completing task P220 by modifying the access state of CPU 102. Note that performing line L130 without generating an exception or other privilege violation may require CPU 102 to be operating at or above a particular privilege level.

As will be described below, instructions subsequent to the instruction of line L130 are then executed to perform tasks P230 and P240. When these tasks have been completed, the original access state of CPU 102 is popped from the stack into register eax (line L200) and then stored into register CR0 (line L210), thereby completing task P250 by restoring the access state of CPU 102.

Tasks P230 and P240 may be performed in several different ways. For example, a method as disclosed by Cook may be used. Another example is now described that may be used with target functions that have a known or knowable prologue.

Each function within an operating system (or each function within a group or class of system functions, such as file access functions or functions associated with a particular application program or hardware component) may begin with a common instruction sequence (i.e. a prologue), as shown in the following example of a function having a three-instruction prologue:

push ebp mov ebp, esp sub esp, x (remainder of code for the particular function)

So long as the length of the prologue is known, task P230 may be performed by copying the prologue to an area reserved within the hook function. (Alternatively, the hook function may be constructed to contain a known prologue already, making task P230 unnecessary.) Task P240 may then be performed by replacing the prologue in the target function with a jump to the hook function, which will execute before (or in place of) the target function. For the prologue in the example above, the hook function may end as follows (where the prologue appears just before the final instruction):

(first part of hook function)

push ebp mov ebp, esp sub esp, x jmp REMADDR where REMADDR is the address of the portion of the code of the target function that follows the prologue. In this example, execution of the hook function will be followed by execution of the target function. Alternatively, the hook function may be made to execute in place of the target function by ending the hook function with a return to the calling function or process.

Figure 6:
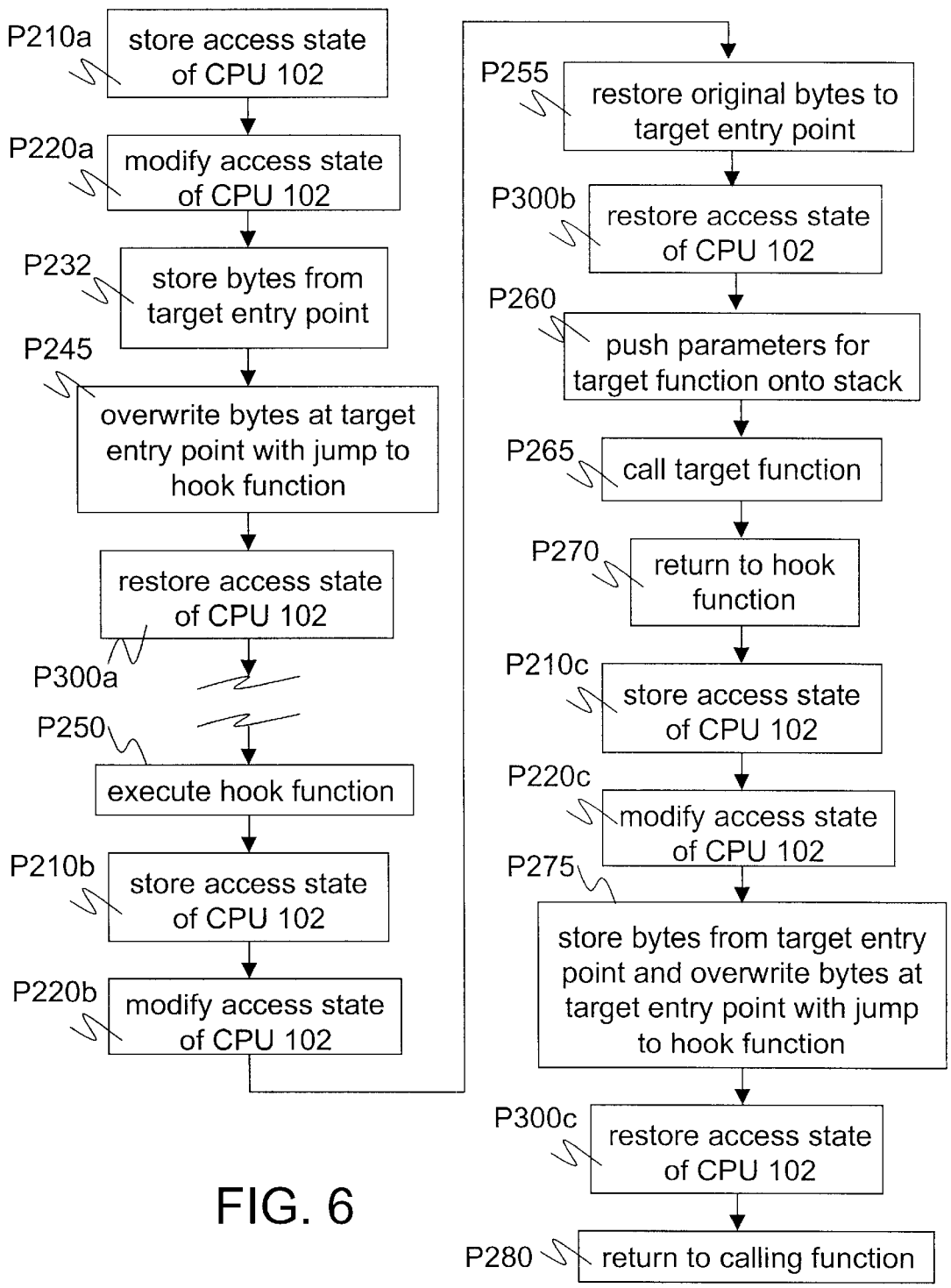
FIG. 6 is a flowchart of a particular implementation of FIG. 4.

One advantage of performing tasks P230 and P240 in this way is that recursive function calls may be supported. While operating system functions may be expected to have a well-defined and uniform structure, however, the characteristics of other system functions (such as functions associated with device drivers) may not be sufficiently predictable to allow this method to be used with confidence with a particular system or configuration. An alternative example for performing a method according to FIG. 4 in such situations is now described with reference to FIG. 6.

In tasks P210a and P220a, the access state of CPU 102 is stored and modified, e.g., as described above. In task P232, a string of bytes is read from the target entry point within the target function (e.g. from the head of the function) and stored. In task P245, the function code of the target function at the target entry point is overwritten with an instruction directing CPU 102 to execute the hook function. This instruction may comprise an unconditional jump to the starting address of the hook function, and the length of the string copied in task P232 may be determined by the length of this instruction. If CPU 102 is an Intel x86 processor, for example, the length of a JMP instruction to be written in task P245 (and correspondingly the minimum length of the string copied in task P232) is five bytes. In task P300a, the original access state of CPU 102 is restored.

As a practical matter, it may be not desirable to perform tasks P232 and P245 before the hook functions are available in memory. Of course, a call to a target function will not be hooked until these tasks or a similar task or sequence of tasks are performed (during initialization of a device, for example). Also note that a group of target functions may be modified at once or, alternatively, a routine according to an implementation of the invention may be executed for each function individually.

At some later time, in task P250, the hook function is executed (e.g. in response to a call to the target function). In this example, it is desired to execute the called function at this time as well. Before the hook function returns, therefore, it restores the original code of the target function (tasks P210b, P220b, P255, and P300b), calls the target function (tasks P260 and P265), and then repeats the modification of the target function after that function terminates and returns (event P270 and tasks P210c, P220c, P275, and P300c). At this point the hook function itself terminates and returns to the calling function or process (task P280).

Note that in another implementation, it may be possible and/or desirable to perform tasks P210a and P220a after task P232. Also, it may be necessary in some cases to perform the stack operation of task P260 while the access state of CPU 102 is modified (i.e. to perform task P300b after task P260 rather than before).

A method or apparatus as described above may be used in any of the applications discussed by Cook, such as virus checking or file indexing. Additional applications include monitoring of system activity for various other purposes. For example, it may be desirable to detect how long a particular application program is in use (e.g. as indicated by the amount of time that a window associated with the program is open). In another case, it may be desirable to obtain information about system activities (e.g. relating to display 104 or input device 106) in order to forward such information to a remote user, thereby supporting remote monitoring of a computer system.

Figure 7:
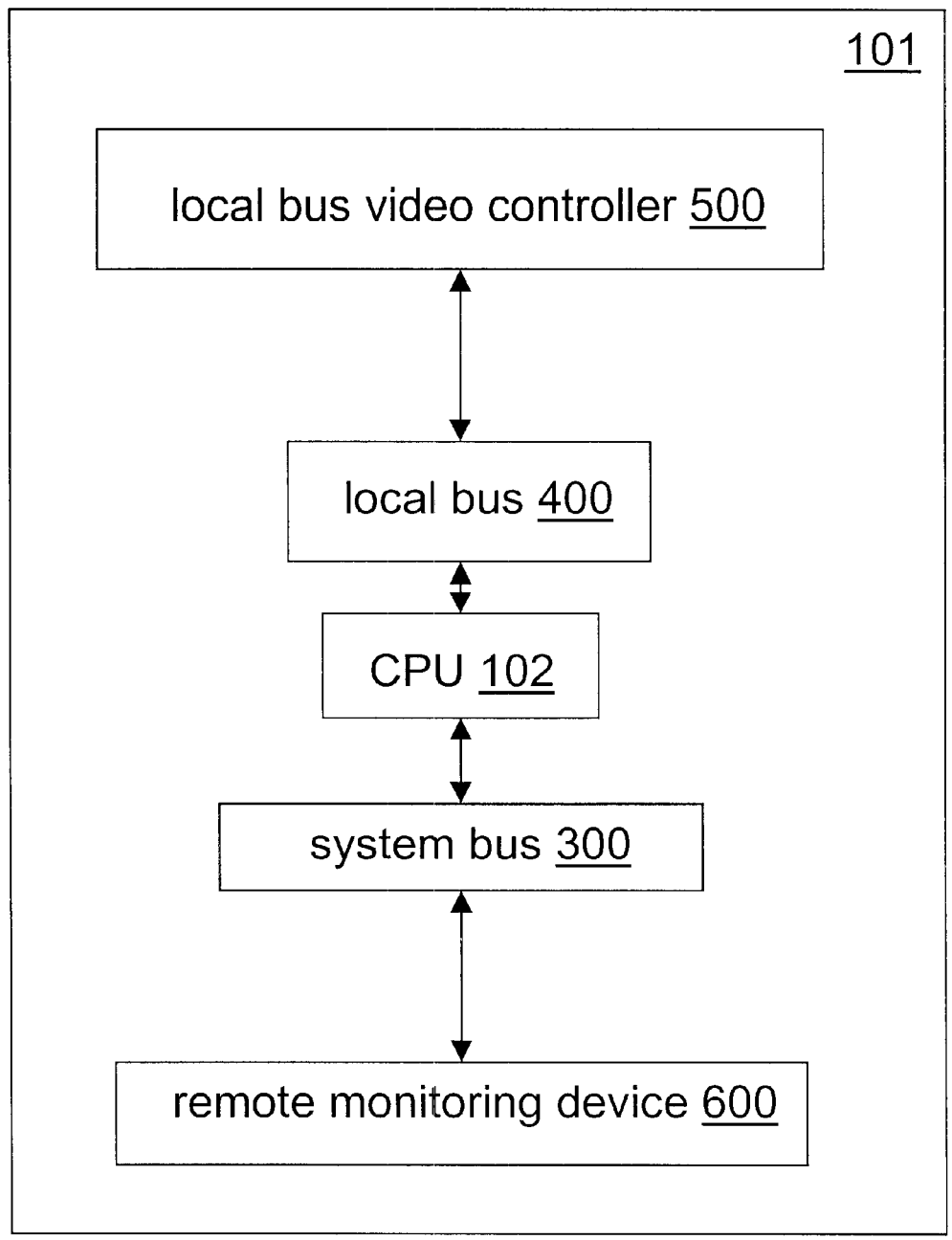
FIG. 7 is a block diagram of a computer including a remote monitoring device.

FIG. 7 shows a block diagram of a computer system 101, similar to system 100 and including a remote monitoring device (RMD) 600. In this example, CPU 102 is coupled to two buses: a system bus 300 (e.g. a PCI (Peripheral Connect Interconnect) bus as defined by PCI Local Bus Specification, rev. 2.2, PCI Special Interest Group, Hillsboro, Oreg.) and a local bus (e.g. an AGP (Accelerated Graphics Port) bus as defined by AGP Specification, rev. 2.0, May 4, 1998, Intel Corp., Santa Clara, Calif.). A local bus video controller 500 (e.g. an AGP video card) is connected to local bus 400, and RMD 600 is connected to system bus 300. RMD 600 receives information about system 101 and transmits the information to a remote user, e.g. via a telephone line or network connection.

In an exemplary application, it is desired to supply RMD 600 with information relating to video activity within system 101. As described above, a method according to an embodiment of the invention may be applied to insert a hook into a display driver function. When the modified target function is called (e.g. by an application program or by another system function), the hook function (e.g. as executed in task P250) forwards information relating to the function call to an area within or accessible by RMD 600, thereby allowing RMD 600 to transmit this information to the remote user. By modifying selected target functions in this manner, remote monitoring of virtually all aspects of the operation of computer 100 may be accomplished with minimal interference. In this example, modification of the display driver functions may be performed anytime before remote monitoring is to begin.

The foregoing presentation of the described embodiments is provided to enable any person skilled in the art to make or use the present invention. Various modifications to these embodiments are possible, and the generic principles presented herein may be applied to other embodiments as well. For example, several functions may be modified at once in this manner, although an implementation of an embodiment as described above may execute quickly enough to make such optimizations unnecessary.

Additionally, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

I claim:

1. A method comprising:
    altering an access state of a processor from a first state to a second state; and
    modifying only a prologue of a system function within a write-protected operating system,
    wherein said modifying is prevented when the access state of the processor is the first state, and
    the system function is at least one of
        an operating system function,
        a hardware function relating to a hardware component, and
        a software function relating to a software component.

2. The method according to claim 1, wherein said access state is determined at least in part by contents of a register of the processor.

3. The method according to claim 2, wherein said altering comprises changing a value of a bit of the register.

4. The method according to claim 3, wherein an ability of the processor to write information to a predetermined area of a memory is determined at least in part by a state of said bit, the prologue of the system function being stored within the predetermined area of the memory.

5. The method according to claim 1, said method further comprising:
    subsequent to said modifying, restoring the access state of the processor to the first state; and
    subsequent to said restoring, receiving a call to the system function.

6. The method according to claim 1, wherein said modifying comprises replacing at least a portion of the prologue of the system function with an instruction to execute a hook function.

7. The method according to claim 1, wherein the system function is called by a recursive function call.

8. The method according to claim 1, further including copying instructions of the system function prior to the modifying, and restoring the instructions subsequent to the modifying.

9. A data storage medium having machine-readable code stored thereon, the machine-readable code comprising instructions executable by an array of logic elements, the instructions defining a method comprising:
   altering an access state of a processor from a first state to a second state; and
   modifying only a prologue of a system function within a write-protected operating system,
   wherein said modifying is prevented when the access state of the processor is the first state, and
   the system function is at least one of
      an operating system function,
      a hardware function relating to a hardware component, and
      a software function relating to a software component.

10. The medium according to claim 9, wherein said access state is determined at least in part by contents of a register of the processor.

11. The medium according to claim 10, wherein said altering comprises changing a value of a bit of the register.

12. The medium according to claim 11, wherein an ability of the processor to write information to a predetermined area of a memory is determined at least in part by a state of said bit, the prologue of the system function being stored within the predetermined area of the memory.

13. The medium according to claim 9, said method further comprising:
   subsequent to said modifying, restoring the access state of the processor to the first state; and
   subsequent to said restoring, receiving a call to the system function.

14. The medium according to claim 9, wherein said modifying comprises replacing said at least a portion of the system function with an instruction to execute a hook function.

15. The method according to claim 9, wherein the system function is called by a recursive function call.

16. The method according to claim 9, further including copying instructions of the system function prior to the modifying, and restoring the instructions subsequent to the modifying.

17. A method comprising:
   altering access state information to produce altered access state information;
   installing the altered access state information to cause an access state change from a first state to a second state; and
   modifying only a prologue of a system function within a write-protected operating system,
   wherein said modifying is prevented when the access state of the processor is the first state, and
   the system function is at least one of
      an operating system function,
      a hardware function relating to a hardware component, and
      a software function relating to a software component.

18. The method according to claim 17, wherein the access state is determined at least in part by a contents of a register of a processor, and
   wherein said installing comprises updating at least a part of the contents of the register.

19. The method according to claim 17, wherein said altering comprises changing the value of information relating to a bit of the register.

20. The method according to claim 19, wherein an ability to write information to a predetermined area of a memory is determined at least in part by a state of said bit, said at least a portion the prologue of the system function being stored within the predetermined area of the memory.

21. The method according to claim 17, said method further comprising:
   subsequent to said modifying, restoring the access state of the processor to the first state; and
   subsequent to said restoring, receiving a call to execute the system function.

22. The method according to claim 17, wherein said modifying comprises replacing at least a portion of the prologue of the system function with an instruction to execute a hook function.

23. The method according to claim 17, wherein the system function is called by a recursive function call.

24. The method according to claim 17, further including copying instructions of the system function prior to the modifying, and restoring the instructions subsequent to the modifying.

25. An apparatus comprising:
   a processor, said processor having an access state; and
   a memory, said memory containing a system function,
   wherein information is stored to a register of said processor to alter the access state of said processor from a first state to a second state, and
   wherein said processor modifies only a prologue of the system function within a write-protected operating system, and
   wherein said processor is prevented from modifying said prologue of the system function when the access state of the processor is the first state, and
   the system function is at least one of
      an operating system function,
      a hardware function relating to a hardware component, and
      a software function relating to a software component.

26. The apparatus according to claim 25, wherein the access state is determined at least in part by a contents of the register of the processor.

27. The apparatus according to claim 25, wherein the access state of the processor is determined at least in part by a value of a bit of the register.

28. The apparatus according to claim 27, wherein an ability of the processor to write information to a predetermined area of a memory is determined at least in part by the value of said bit, the prologue of the system function being stored within the predetermined area of the memory.

29. The apparatus according to claim 25, wherein after said processor modifies the prologue of the system function, the access state of the processor is restored to the first state, and
   wherein, after the access state of the processor is restored to the first state, the processor receives a call to the system function.

30. The apparatus according to claim 25, wherein said processor modifies the prologue of the system function by replacing at least a portion of the prologue of the system function with an instruction to execute a hook function.

31. The method according to claim 25, wherein the system function is called by a recursive function call.

32. The method according to claim 25, further including copying instructions of the system function prior to the modifying, and restoring the instructions subsequent to the modifying.

* * * * *